United States Patent [19]

Green

[11] 4,151,632

[45] May 1, 1979

[54] METHOD OF MAKING AN INTERLOCKING PIPE BALL JOINT

[75] Inventor: Terrence A. Green, Columbus, Ind.

[73] Assignee: Arvin Industries, Inc., Columbus, Ind.

[21] Appl. No.: 840,233

[22] Filed: Oct. 7, 1977

Related U.S. Application Data

[62] Division of Ser. No. 733,352, Oct. 18, 1976.

[51] Int. Cl.² .............................................. B23P 11/00
[52] U.S. Cl. .................................. 29/441 R; 29/523; 285/382.5
[58] Field of Search .................. 29/523, 441 R, 421 R; 285/263, 331, 382.4, 382.5

[56] References Cited

U.S. PATENT DOCUMENTS

| 604,863 | 5/1898 | Hoyer | 285/382.5 X |
| 2,479,702 | 8/1949 | Rood | 29/523 X |
| 2,949,319 | 8/1960 | Hutchins | 285/382.5 X |
| 3,002,269 | 10/1961 | Hopkins | 29/523 X |
| 3,434,194 | 3/1969 | Whittalden et al. | 29/523 X |
| 3,555,831 | 1/1970 | Pogonowski | 29/523 X |

Primary Examiner—Leon Gilden
Attorney, Agent, or Firm—Jenkins, Coffey & Hyland

[57] ABSTRACT

A ball joint for connecting lengths of pipe particularly for use in automotive exhaust systems. One end of a first pipe is enlarged to an increased diameter to form a female portion into which one end of a second pipe is received. A tubular sleeve is inserted into said first pipe and connected thereto as by welding. The sleeve and the female portion together define an annular, axially elongated and radially narrow passage receiving said one end of said second pipe. The first and second pipes and the sleeve are together placed in a die, and the overlapping ends are spun radially outwardly by an internal, expansible arbor or the like to form a generally spherical, interlocking pipe ball joint.

11 Claims, 6 Drawing Figures

METHOD OF MAKING AN INTERLOCKING PIPE BALL JOINT

This is a division of application Ser. No. 733,352 filed Oct. 18, 1976.

BACKGROUND OF THE INVENTION

This invention relates to apparatus and method for movably interconnecting lengths of pipe. More specifically, this invention relates to a ball joint pipe connection for movably interlocking adjacent ends of a pair of pipes in an automotive exhaust system.

In the prior art, a wide variety of pipe connections are well known. Such pipe connections are particularly useful in automotive exhaust systems wherein interconnected pipe networks extend from one or more exhaust gas manifolds through a catalytic converter and/or muffler, and further to the rear of an automotive vehicle. Of particular importance are the variety of exhaust pipe connections which allow for relative movement between interconnected lengths of pipe. That is, it is often necessary in automotive exhaust systems to provide pipe connections which allow relative movement between connected pipes to compensate for the continuous vibrational and torsional forces inherent with an internal combustion engine. Without such relative movement, cracks and leaks in the system tend to develop prematurely to require frequent replacement of system components.

In the past, various schemes such as the use of convoluted piping and spring-loaded flange assemblies have been proposed for compensating for the shakes and vibrations transmitted from an internal combustion engine to an exhaust system. A variety of ball-type pipe joints have also been proposed. See, for example, U.S. Pat. Nos. 3,002,269; 2,318,006; and 2,319,939. However, with modern automotive exhaust systems, it is imperative that all pipe connections are leak free for a prolonged operating life. Further, it is desirable that such pipe connections are quickly and easily formed from inexpensive materials. Pipe connections of the prior art have not satisfactorily fulfilled these needs.

For the most part, automotive manufacturers have heretofore mounted internal combustion engines with their crankshafts extending longitudinally with respect to the vehicle chassis. In this manner, exhaust pipe connections have been primarily required to withstand axial rotation between adjacent pipes together with shaking and vibrating of relatively small magnitude. However, some automotive manufacturers have recently determined that mounting of an engine with its crankshaft extending transversely of the vehicle chassis can be advantageous under certain conditions, particularly for use with front wheel drive systems. Such transversely mounted engines, however, require exhaust pipe connections to withstand larger relative angular deflections as well as the inherent shaking, vibrating, and rolling. Pipe connections must account for these movements in a gas sealing and relatively long-lived manner. Pipe connections of the piror art have not satisfactorily met these requirements.

This invention overcomes the problems of the prior art by providing a ball joint connection for interlockingly connecting lengths of exhaust pipe in a manner to allow substantial relative movement between the lengths of pipe in any angular or rotational direction. Moreover, the ball joint connection of this invention allows such relative movement while interconnecting the lengths of pipe in a long-lived and substantially gas leak-free manner.

SUMMARY OF THE INVENTION

In accordance with this invention, in a preferred embodiment, a ball joint connection for lockingly interconnecting lengths of exhaust pipe is provided comprising a first pipe having one end expanded outwardly to an increased diameter. A tubular sleeve is inserted within the end of the first pipe, and is secured therein to the non-expanded portion of the pipe as by spot welding to form an axially extending, radially narrow annular passage between the expanded portion of the first pipe and the sleeve. A second pipe which may be identical to the non-expanded portion of the first pipe is inserted into the annular passage whereby the tubular sleeve and the adjacent ends of the first and second pipes overlap.

The ball joint connection of this invention is formed by placing the overlapping ends of the first and second pipes and the tubular sleeve in a die block having a ball-shaped die opening. A spinning arbor or the like with a ball-shaped head expansible upon spinning is positioned within the overlapping pipe ends, and is spun to cause the pipe ends and the tubular sleeve to expand outwardly and conform to the shape of the die opening. The overlapping pipe ends and the sleeve thereby assume interlocking concentric spherical shapes to permit angular and rotational movement of the first and second pipes with respect to each other.

BRIEF DESCRIPTION OF THE DRAWINGS

The accompanying drawings illustrate the invention. In such drawings.

DETAILED DESCRIPTION OF THE PREFERRED EMBODIMENT

Figure 1:
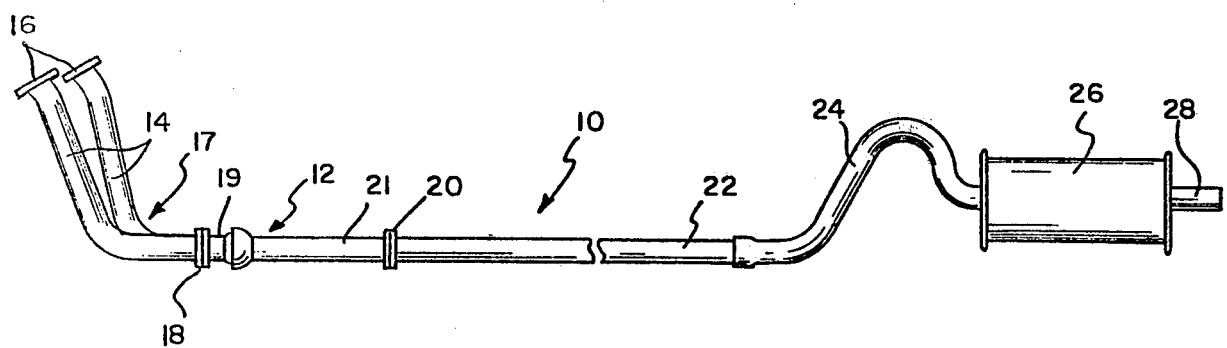
FIG. 1 is a diagrammatic representation of an automotive exhaust system having a ball joint connection of this invention.

An automotive exhaust system 10 utilizing a ball joint connection 12 of this invention is shown generally in FIG. 1. As shown, the exhaust system 10 comprises a series of forward exhaust pipes 14 having mounting flanges 16 for coupling to an exhaust gas manifold (not shown) of an internal combustion engine. The forward exhaust pipes 14 initially collect exhaust gases exiting the manifold, and merge together at a "Y" junction 17 before terminating at a flange connector 18. The flange connector 18 couples the forward exhaust pipes 14 to a single rearwardly extending pipe section 19 forming part of the ball joint connection 12, and further through an overlapping pipe section 21 which also forms part of the ball joint connection. The rear end of the latter pipe section 21 is coupled through a flange connector 20 to an intermediate exhaust pipe 22 which in turn is connected to the rear of the system through a kick-over pipe 24, a muffler 26, and a tail pipe 28. Conveniently, all of the pipes in the system are formed from steel tubing or the like of the type typically used in automotive exhaust systems.

The ball joint connection 12 of this invention permits angular and rotational movement of the overlapping pipe sections 19 and 21 with respect to each other, and thereby allows relative angular and rotational movement between the forward exhaust pipes 14 fixed to the engine (not shown) and the intermediate pipe 22, muffler 26, etc. which are fixed to the vehicle chassis (not shown). This allows the forward exhaust pipes 14 to move with the engine as during acceleration and deceleration, and to shake and vibrate with the engine independent of the exhaust components at the rear of the exhaust system. Importantly, the ball joint 12 connection accommodates such movement without allowing exhaust gases to leak therefrom.

Figure 2:
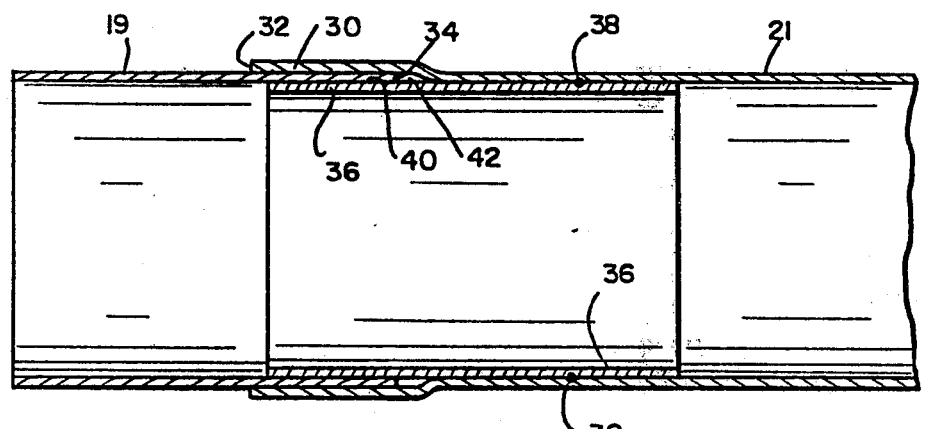
FIG. 2 is a vertical section of overlapping pipes illustrating one stage in the formation of the ball joint connection of this invention.
Figure 3:
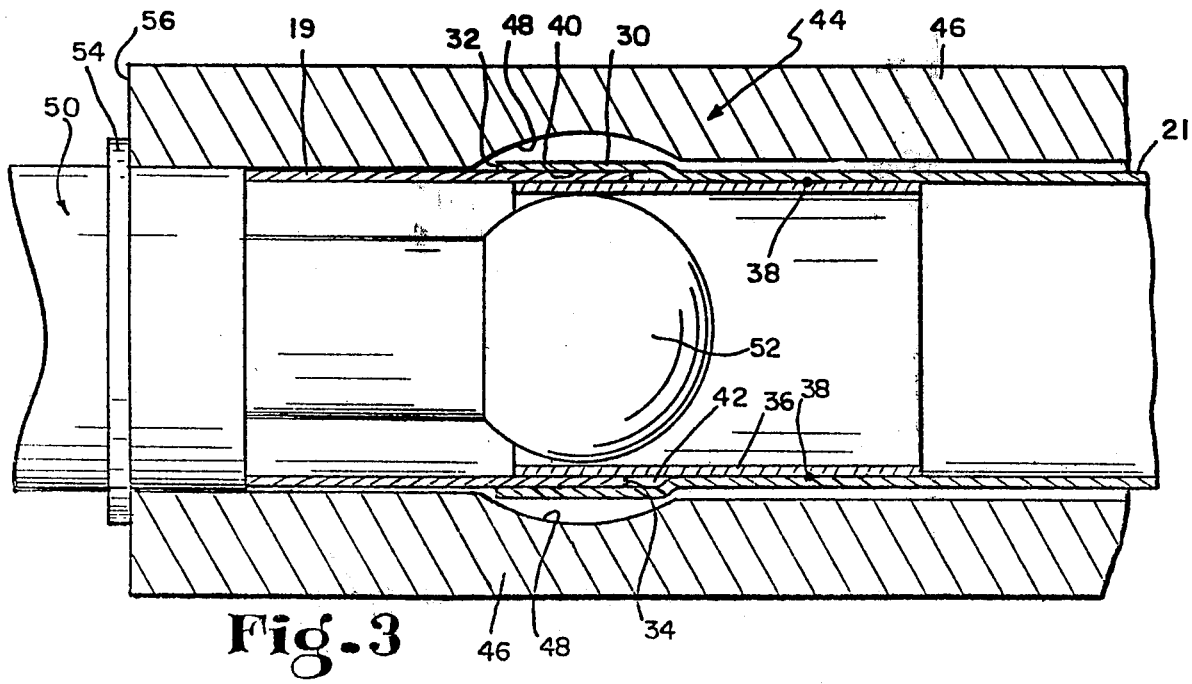
FIG. 3 is a vertical section of the overlapping pipes carried in a die block and illustrating a subsequent stage in the formation of this invention.
Figure 4:
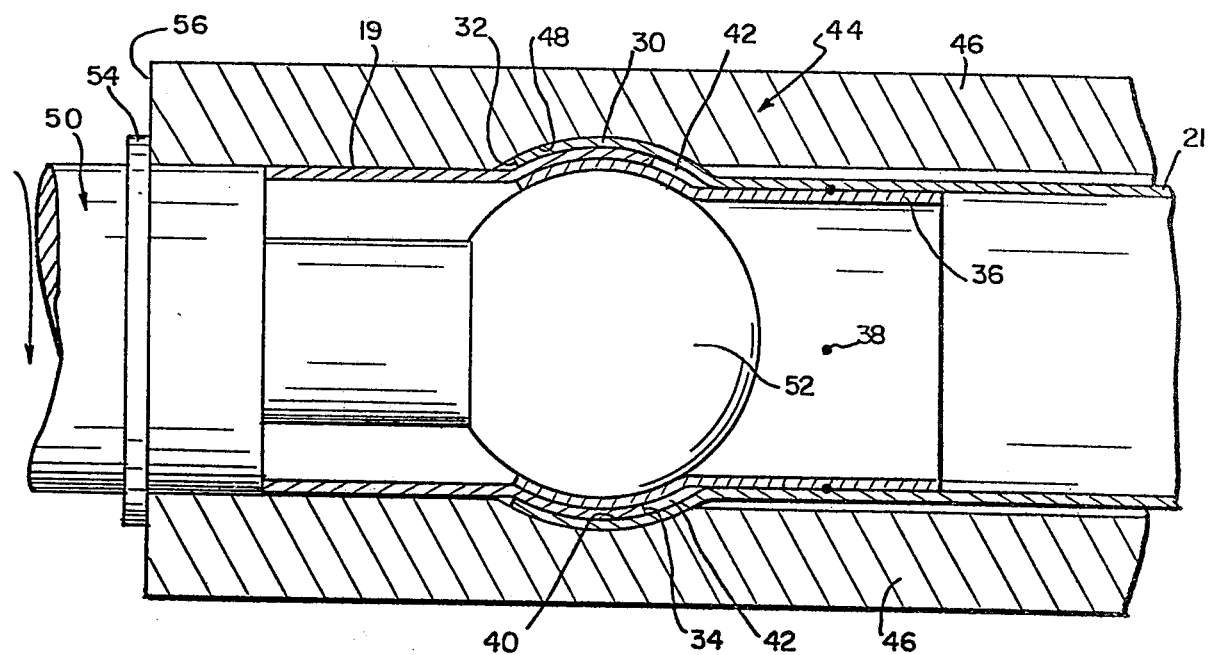
FIG. 4 is a vertical section of the overlapping pipes carried in the die block and illustrating a final stage in the formation of this invention.

The specific construction of the ball joint connection 12 of this invention and the method of making it are shown in FIGS. 2-4. As shown, the ball joint connection comprises the two pipe sections 19 and 21 formed from the same size of tubing and interconnected end-to-end in an overlapping manner. More specifically, the rear pipe section 21 has its forwardly facing end expanded radially outwardly to an increased diameter to form an axially extending female connecting portion 30. This female portion 30 has an inner diameter shaped for close slidable reception of the rearwardly facing end 34 of the front pipe section 19.

A tubular sleeve 36 formed from metal tubing or the like is slidably received within the rear pipe section 21, and is thereby also slidably receivable within the other pipe section 19. The sleeve 36 is fixed to the pipe section 21 by a plurality of circumferentially spaced spot welds 38 or the like. From the welds 38, the sleeve 36 extends forwardly and is concentrically spaced from the female portion 30 of the pipe section 21, and terminates slightly to the rear of the forwardmost end 32 of said female portion 30. In this manner, the sleeve 36 and the female portion 30 together define therebetween a forwardly open, axially elongated and radially narrow annular passage 40.

The front pipe section 19 is slidably received rearwardly into the annular passage 40 between the female portion 30 of the rear pipe section 21 and the tubular sleeve 36. Thus, the front pipe section 19 overlaps with and slidably engages the rear pipe section 21 and the tubular sleeve 36. Importantly, for reasons which will become apparent hereinafter, the front pipe section 19 is positioned in the passage 40 to provide a relatively short axially extending and radially narrow annular gap 42 between the rearwardly facing end 34 of the pipe section 19 and the non-expanded portion of the rear pipe section 21.

The ball joint connection 12 of this invention is formed by placing the overlapping interfitting pipe sections 19 and 21 and the sleeve 36 within a die block 44, as illustratively shown in FIGS. 3 and 4. The die block 44 comprises a pair of opposed die halves 46 which together form a generally ball-shaped central cavity 48. The pipe sections 19 and 21 are placed within the die block 44 as shown in FIG. 3 with the vertical centerline of the overlapping ends of the pipe sections positioned at the vertical axis of the ball-shaped cavity 48.

A spinning arbor 50 having an expansible ball-shaped head 52 is inserted into the die block 44 with its head 52 positioned within the pipe sections 19 and 21 and the sleeve 36. Importantly, the head 52 is axially positioned within the pipe sections by means of a flange 54 abutting one end 56 of the die block so that the vertical axis of the head 52 corresponds with the vertical axis of the ball cavity 48. Then, as illustrated in FIG. 4, the arbor 50 is spun by a suitable driving motor (not shown) whereby the head 52 expands. The expanding head 52 forces the overlapping ends of the pipe sections 19 and 21 and the tubular sleeve 36 outwardly to assume concentric spherical configurations conforming to the shape of the die block cavity 48, and thereby forming the ball joint connection 12 of this invention.

The ball joint connection 12 interconnects the pipe sections 19 and 21 so that the front pipe section 19 is rotationally and angularly movable within the annular passage 40 and with respect to the rear pipe section 21. The magnitude of angular deflection between the two pipe sections 19 and 21 is dependent upon the axial length of the gap 42, with an angular deflection of up to about fifteen degrees being sufficient for most applications.

The ball joint connection 12 of this invention is highly advantageous for use with automotive exhaust systems. The ball joint is quickly and inexpensively made, and provides a relatively tight gas-sealing connection between the two pipe sections 19 and 21 without the use of special sealants, insulators, etc. That is, the ball joint connection is relatively leak-free because of the elongated path along which exhaust gases must flow in order to escape radially outwardly therethrough. Specifically, gases must travel between the close slidable connection of the tubular sleeve 36 and the front pipe section 19, and then change direction and travel between the close slidable connection of the front and rear pipe sections 19 and 21. This labyrinth type construction has been found to create a sufficient pressure differential during use between the inside of the ball joint connection 12 and ambient pressure such that the connection is substantially leak-free.

In one specific working embodiment of the ball joint connection 12 of this invention, the rear pipe section 21 comprised steel tubing having a length of about one foot, and an outside diameter of two inches with a wall thickness of about one-eighth inch. The female portion 30 of the pipe section 21 was expanded outwardly over an axial length of about one inch to have an inside diameter of about two inches. The inner sleeve 36 comprised a length of steel tubing having an outside diameter of about one and seven-eights inches for close slidable reception into the non-expanded portion of the pipe section 21 and into the front pipe section 19, which was also formed from two-inch diameter steel tubing. The gap 42 between the rearwardly facing end 34 of the front pipe section 19 and the non-expanded portion of the rear pipe section 21 was about one-quarter inch to allow an angular deflection between the interconnected pipe sections 19 and 21 of between about one and two degrees. The ball joint connection was then formed in a die block 44 having a spherical diameter of about two and one-half inches.

The assembled ball joint connection 12 was tested apart from an automotive exhaust system by fixing the front pipe section 19 and by oscillating the rear pipe section 21 by applying a forty-five pound force thereto at the end opposite the ball joint and moving that end through a stroke of about one-half inch. With air supplied at a pressure of about fifteen pounds per square inch (15 p.s.i) through the connected pipe sections 19 and 20, the ball jointly initially had a gas leakage rate of about four hundred standard cubic centimeters per minute (400 s.c.c.m.). After 200,000 oscillations, the leakage rate increased to about 1700 s.c.c.m. The rate substantially decreased to about 175 s.c.c.m. after 400,000 cycles, and to about 120 s.c.c.m. after about 1,000,000 cycles.

The same ball joint connection 12 was then installed as part of an automobile exhaust system and used during normal operation of an automobile for one week. The connection was then removed from the automobile and oscillated as described above for another 10,000 cycles. Then, using air at 15 p.s.i., the connection exhibited a leakage rate of zero. The air pressure was increased to about 20 p.s.i., and the connection was still substantially leak-free.

From testing the ball joint connection of this invention, it became apparent that the leak-resistance characteristics of the connection were apparently the result of several factors. First, the slidably interfitting pipe sections 19 and 21 and the sleeve 36 created a relatively tight labyrinth type path substantially preventing gas leaks. These leak-free characteristics improve during use as the sliding metal components rub against and seat against each other. The sealing and seating action is enhanced by products of combustion, such as carbon, particulates, etc. from the engine which tend to become entrapped between the sliding surfaces. Further, the heat and cooling of the pipe sections and sleeve during normal use of an automobile tends to cause further mating and conformity of the sliding surfaces with each other.

Figure 5:
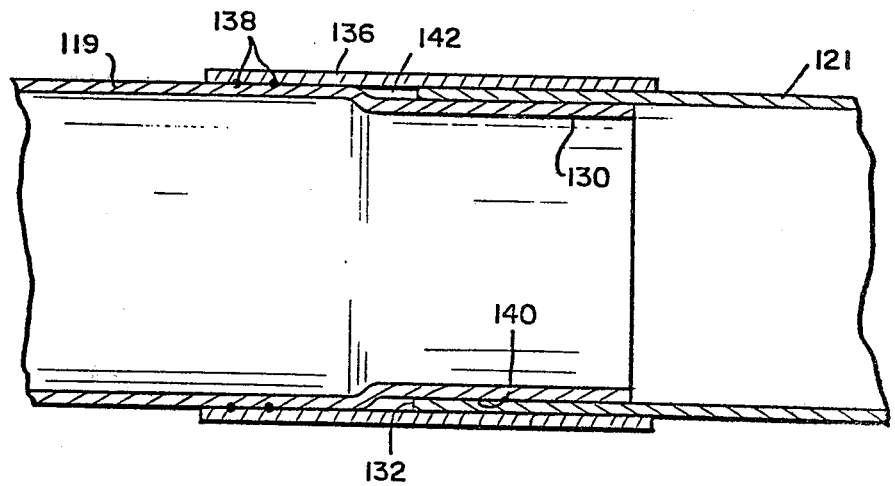
FIG. 5 is a vertical section of overlapping pipes illustrating one stage in the formation of a modified ball joint connection of this invention.
Figure 6:
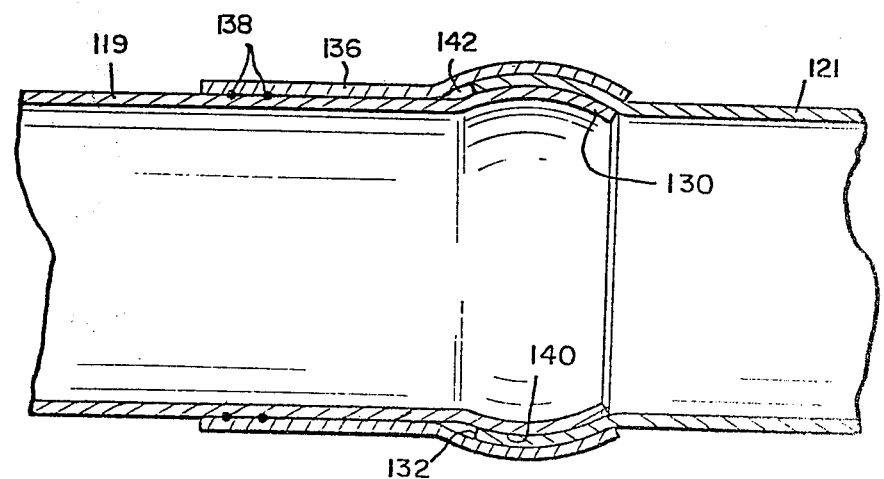
FIG. 6 is a vertical section of the overlapping pipes of FIG. 5 illustrating a final stage in the formation of this invention.

While this invention has been disclosed and described as comprising slidably interfitting lengths of steel tubing with an inner tubular sleeve, it should be understood that various modifications are possible within the scope of this invention. For example, the pipe sections can be reversed with respect to the engine. The spherical pipe configurations can be formed with alternate apparatus, such as bulge forming equipment. Further, different orientations of the pipe sections and the sleeve with respect to each other are possible. For example, as shown in FIGS. 5 and 6, front and rear pipe sections 119 and 121 are formed from identical sizes of tubing with the front section 119 having a male portion 130 necked down to a reduced diameter. The front pipe section 119 has an outer tubular sleeve 136 slidably received thereover and fixed thereto as by circumferentially spaced spot welds 138 or the like. The outer sleeve 136 and the male portion 130 together form a radially narrow, axially extending annular passage 140 for slidable reception of the rear pipe section 121. The pipe section 121 is received in the opening 140 and the overlapping pipe sections 119 and 121 and the sleeve 136 are together shaped as described with the previous embodiment to concentric spherical configurations as shown in FIG. 6. Again, the interlocking pipe sections 119 and 121 are rotationally and angularly movable with respect to each other, with the magnitude of angular deflection being dependent upon the axial length of a gap 142 between the forward end 132 of the pipe section 121 and the non-reduced portion of the front pipe section 119.

I claim:

1. A method of making a ball joint connection from first and second pipes comprising the steps of inserting one end of said second pipe into one end of said first pipe; fixing a sleeve to one of said first and second pipes so that said sleeve and said one of said pipes fixed to said sleeve form a passage open at one end for insertion of said one end of the other pipe whereby said one end of said first pipe and said one end of said second pipe and said sleeve overlap; and generally concentrically spherically shaping the overlapping ends of said first and second pipes and said sleeve so that said first and second pipes are movable with respect to each other.

2. A method as set forth in claim 1 wherein said first and second pipes are formed from identical sized tubing, said step of inserting one end of said second pipe into one end of said first pipe includes expanding said one end of said first pipe to an increased diameter corresponding to the outer diameter of said second pipe, and said step of fixing said sleeve comprises inserting said sleeve within said first and second pipes and connecting said sleeve to said first pipe.

3. A method as set forth in claim 1 wherein said first and second pipes are formed from identical sized tubing, said step of inserting one end of said second pipe into one end of said first pipe includes necking down said one end of said second pipe to a reduced diameter corresponding to the inner diameter of said first pipe, and said step of fixing said sleeve comprises placing said sleeve over said first and second pipes and connecting said sleeve to said second pipe.

4. A method as set forth in claim 1 including the step of spacing the one end of the pipe inserted in said passage from the closed end of said passage.

5. A method as set forth in claim 1 wherein said shaping step comprises placing the overlapping ends of said first and second pipes and said sleeve in a die having a generally spherical central cavity, and forcing said overlapping ends and sleeve with expansible means received therein to generally conform to the shape of said cavity.

6. A method of making a ball joint connection from first and second pipes comprising the steps of inserting one end of said second pipe into one of said first pipe; fixing a sleeve to one of said first and second pipes to form an axially extending radially narrow annular passage open at one end for insertion of said one end of the other pipe and closed at the opposite end whereby said one end of said first pipe and said one end of said second pipe and said sleeve overlap; and generally concentrically spherically shaping the overlapping ends of said first and second pipes and said sleeve so that said first and second pipes are movable with respect to each other.

7. A method of making a pipe connection from first and second pipes comprising the steps of connecting together a first pipe and a sleeve to form an annular passage open at one end and closed at the opposite end; inserting one end of a second pipe into said passage whereby said first pipe and sleeve and said one end of said second pipe overlap; and generally concentrically spherically shaping said first pipe and sleeve and said one end of said second pipe so that said second pipe is movable within said passage.

8. A method of making a pipe connection as set forth in claim 7 wherein said first pipe and sleeve are connected together to form an axially elongated, radially narrow annular passage.

9. A method of making a pipe connection as set forth in claim 7 wherein said inserting step comprises spacing said one end of said second pipe from said opposite end of said passage.

10. A method of making a ball joint connection from first and second pipes of identically sized tubing, comprising the steps of necking down one end of the second pipe to a reduced diameter corresponding to the inner diameter of the first pipe; inserting the necked-down end of the second pipe into one end of the first pipe; placing a sleeve over the first and second pipes and fixing the sleeve to the second pipe so that the one end of the first pipe and the one end of the second pipe and the sleeve overlap; and generally concentrically spherically shaping the overlapping ends of the first and second pipes and the sleeve so that the first and second pipes are movable with respect to one another.

11. A method of making a ball joint connection from first and second pipes of identically sized tubing, comprising the steps of expanding one end of the first pipe to an increased diameter corresponding to the outer diameter of the second pipe; inserting one end of the second pipe into the end of the first pipe having the increased diameter; inserting a sleeve within the first and second pipes and fixing the sleeve to the first pipe so that the one end of the first pipe and the one end of the second pipe and the sleeve overlap; and generally concentrically spherically shaping the overlapping ends of the first and second pipes and the sleeve so that the first and second pipes are movable with respect to each other.

* * * * *

UNITED STATES PATENT AND TRADEMARK OFFICE
CERTIFICATE OF CORRECTION

PATENT NO. : 4,151,632
DATED : May 1, 1979
INVENTOR(S) : Terrence A. Green

It is certified that error appears in the above-identified patent and that said Letters Patent are hereby corrected as shown below:

Column 4, line 54, change "seven-eights" to --seven-eighths--.

Column 6, line 43, (claim 6), after "into one", insert --end--.

Signed and Sealed this

Sixteenth Day of October 1979

[SEAL]

Attest:

RUTH C. MASON
Attesting Officer

LUTRELLE F. PARKER
Acting Commissioner of Patents and Trademarks